US012233772B2

(12) United States Patent
Weston et al.

(10) Patent No.: US 12,233,772 B2
(45) Date of Patent: Feb. 25, 2025

(54) VEHICLE LIMITED-USE SYSTEM CONTROL USING GEO-FENCING

(71) Applicant: FORD GLOBAL TECHNOLOGIES, LLC, Dearborn, MI (US)

(72) Inventors: Keith Weston, Canton, MI (US); Brendan F. Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 17/949,426

(22) Filed: Sep. 21, 2022

(65) Prior Publication Data

US 2024/0092249 A1    Mar. 21, 2024

(51) Int. Cl.
*B60Q 1/14*  (2006.01)
*B60Q 1/24*  (2006.01)
*H04W 4/40*  (2018.01)

(52) U.S. Cl.
CPC .............. *B60Q 1/1423* (2013.01); *B60Q 1/24* (2013.01); *H04W 4/40* (2018.02); *B60Q 2300/05* (2013.01); *B60Q 2300/30* (2013.01)

(58) Field of Classification Search
CPC ......... H04W 4/40; B60Q 1/1423; B60Q 1/24; B60Q 2300/05; B60Q 2300/30; B60Q 2300/33; B60Q 1/22; B60Q 1/18
See application file for complete search history.

(56) References Cited

U.S. PATENT DOCUMENTS

| 10,538,195 | B2  |   | 1/2020  | Fritz et al.   |            |
|------------|-----|---|---------|----------------|------------|
| 10,750,317 | B2  |   | 8/2020  | Imes           |            |
| 10,773,635 | B1  | * | 9/2020  | Adams-Campos   | B60Q 1/0076 |
| 11,148,680 | B2  |   | 10/2021 | Sikorski       |            |
| 2018/0236928 | A1 | * | 8/2018  | Fritz          | B60Q 1/245 |
| 2019/0176684 | A1 | * | 6/2019  | Zych           | G06V 20/58 |

FOREIGN PATENT DOCUMENTS

| KR | 20150031140 A  | 3/2015 |
|----|----------------|--------|
| KR | 101840333 B1   | 3/2018 |

* cited by examiner

*Primary Examiner* — Brian Wilson
(74) *Attorney, Agent, or Firm* — Joseph Zane; Brooks Kushman P.C

(57) ABSTRACT

A vehicle includes a vehicle feature predesignated as limited-use and may determine that a conditional parameter for enabling the vehicle feature has been met, based at least on a present vehicle state. The vehicle engages the vehicle feature responsive to the present vehicle state meeting the conditional use parameter and monitors changes to the present vehicle state. Also, the vehicle automatically controls the feature in accordance with changes to the present vehicle state, to adaptively control the vehicle feature reactive to the changes to the present vehicle state relative to the conditional use parameter.

7 Claims, 3 Drawing Sheets

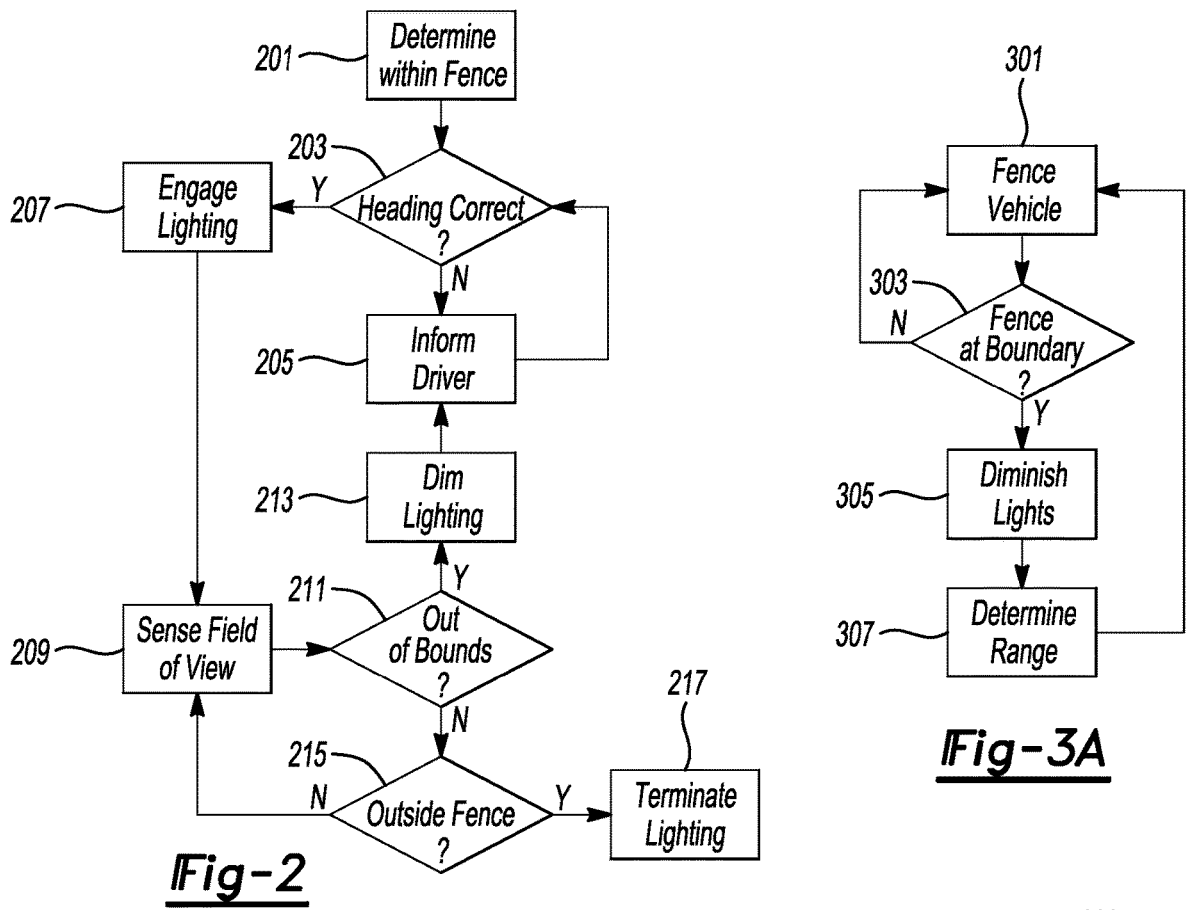
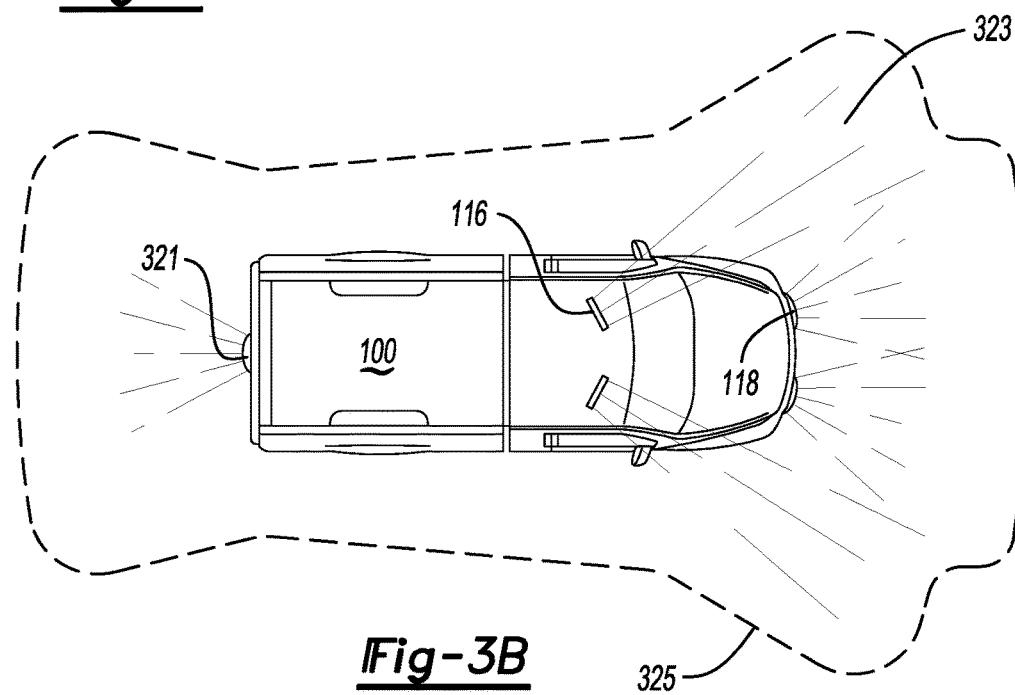

VEHICLE LIMITED-USE SYSTEM CONTROL USING GEO-FENCING

TECHNICAL FIELD

The illustrative embodiments generally related to vehicle limited-use system control using geo-fencing.

BACKGROUND

Aftermarket additions to vehicles are a popular choice, especially for enthusiast who want advanced lighting, specialized cargo or entry lifts, and other custom details. An example of this is lighting, wherein advanced lighting systems may provide light that is too excessive for meeting certain requirements. Manufacturers may shy away from adding such lighting, or add the lighting and include plastic coverings and other features that detract from an overall vehicle appearance and cause the customer some minor headache in having to uncover the lights when use of the lights is permissible.

Customers may be obligated to replace such covers as well, and forgetting to do so may render the vehicles impermissible for road travel. This can generally deter customers from adding such features, even if they would make using a vehicle more enjoyable, and allow for full use of the vehicle in certain circumstances.

SUMMARY

In a first illustrative embodiment, a vehicle includes a vehicle feature predesignated as limited-use and one or more processors configured to determine that a conditional parameter for enabling the vehicle feature has been met, based at least on a present vehicle state. The one or more processors are further configured to engage the vehicle feature responsive to the present vehicle state meeting the conditional use parameter and monitor changes to the present vehicle state. Also, the one or more processors are configured to automatically control the feature in accordance with changes to the present vehicle state, to adaptively control the vehicle feature reactive to the changes to the present vehicle state relative to the conditional use parameter.

In a second illustrative embodiment, a method for controlling a vehicle feature predesignated as limited-use includes determining that a conditional parameter for enabling the vehicle feature has been met, based at least on a present vehicle state. The method also includes engaging the vehicle feature responsive to the present vehicle state meeting the conditional use parameter and monitoring changes to the present vehicle state. The method further includes automatically controlling the feature in accordance with changes to the present vehicle state, to adaptively control the vehicle feature reactive to the changes to the present vehicle state relative to the conditional use parameter.

In a third illustrative embodiment, a method includes determining that a vehicle location is within a virtual boundary defining an area where a use-limited advanced vehicle lighting system is permitted for use, based on information associated with the area. The method also includes enabling usage of the vehicle lighting system responsive to determining that the location is within the virtual boundary. The method additionally includes tracking the vehicle location while a vehicle travels within the area and, responsive to the vehicle location changing to outside the virtual boundary, disabling the vehicle lighting system.

BRIEF DESCRIPTION OF THE DRAWINGS

FIG. 2 shows an illustrative feature enablement process;

FIG. 3A shows an illustrative feature control process;

FIG. 3B shows an illustrative geofence around a vehicle;

DETAILED DESCRIPTION

Figure 1:
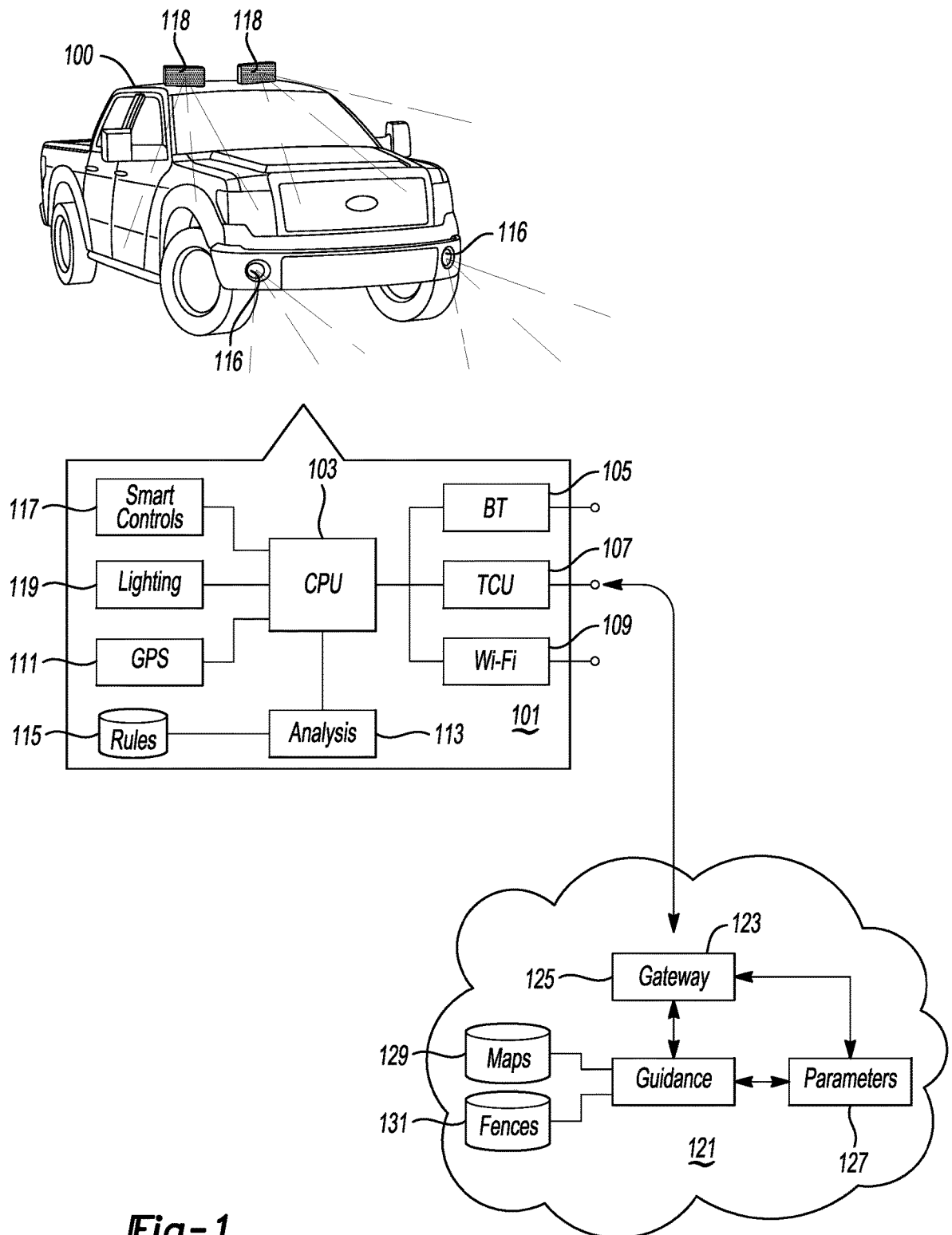
FIG. 1 shows an illustrative example of a vehicle system for dynamic control over onboard systems.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments are generally described with respect to vehicle lighting systems, such as high output lighting that may be only usable on private land. It is appreciated that other temporarily enableable vehicle systems may also be controlled in a similar manner. While processes for mitigating light overspill and effect on surroundings are described with respect to light, it is appreciated that similar control processes can be implemented with respect to other features and the triggers for control can be based on the effect on surroundings of those features. For example, if vehicle external speakers were prohibited under certain circumstances, control systems could predict ranges where sound levels were above permissible levels and control the sound accordingly when a vehicle was near the edge of private land, including disabling speakers on a side adjacent to public land or controlling volumes. While not the same precise considerations given to light, as described in the embodiments, the idea of mitigating effects based on proximity to areas where effects should be mitigated can be preserved through numerous comparable examples and those are not outside the scope of contemplation. The general premise is to consider why certain system usage is limited and attempt to ensure that those reasons are met, when possible, even if the vehicle location is not technically a location where such usage is expressly prohibited. This is not the only purpose of the embodiments, and this is not a limitation to be imposed on embodiments or claims, but rather an example of how the concept can be expanded conceptually while remaining within the scope of contemplation.

In the lighting example, certain levels of vehicle lighting tend to be prohibited on public roads. While it would be easier for the driver of an ego vehicle if the entire world around the vehicle were illuminated, this could create issues for drivers of other vehicles, pedestrians, homeowners, etc. At the same time, when a vehicle is traveling on completely private land, and alone, the vehicle may benefit from enhanced lighting in multiple directions, and a properly equipped vehicle could do so without reprisal implications.

Since lighting has a range, but glare also has a range, enabling enhanced lighting can be contemplative of range based on illuminance and known boundaries can be accommodated by dynamically adjusting lighting to keep glaring light within the boundaries. This can result in fluctuations in lighting, but without other vehicles or people to be affected by changes, the driver may easily adapt to this and maximally enjoy light usage without creating lasting effect on others.

FIG. 1 shows an illustrative example of a vehicle system for dynamic control over onboard systems. In this example, the vehicle 100 includes an onboard computing system 101 that includes one or more processors 103. The system may also include one or more transceivers, such as BLUETOOTH 105, telematics control unit (TCU) 107 providing long range cellular communication, and a Wi-Fi transceiver 109.

The vehicle may include or have access to a GPS coordinate system 111 usable to determine when a vehicle is entering private land, where restricted functions may be used, as well as useful for determining proximities to boundaries of such land when function-limiting is engaged near certain boundaries. An analysis process 113 with access to a rules database 115 may determine what systems can be used when, and with what constraints. This can include active ongoing analysis of system usage to maintain meeting requirements set forth in the rules database 115. Smart controls 117 can adaptively change vehicle functions, such as lighting 119, in a manner to maintain appropriate levels or control output, and this should allow the vehicle full or greater usage of use-limited systems when situationally appropriate. The vehicle 100 includes, in this example, enhanced headlights 116 and steerable overhead lights 118 that can be aimed in various directions when use is permitted.

A cloud system 121 may include a gateway 123 for request handling, as it may handle countless requests related to numerous vehicle features and systems. Requests related to limited-use features may be directed to a guidance process 125, which can analyze maps 129 and geofences 131 to determine when a vehicle 100 can use certain features, and what the boundaries and any local constraints on such feature usage might be. Parameters process 127 may define a set of temporary considerations for a geofenced area and return this to the vehicle, which can be used by the smart controls or analysis process to determine when feature usage should be limited.

For example, if advanced lighting systems were permitted to be fully used within 85 percent of a geofence, without fear of glaring light bleeding over, travel within those areas could use the features without limiting, to a driver's content. A public road may be adjacent to one side of the boundary, however, and light entering that roadway from the vehicle 100 may be controlled to be non-glaring in nature, and/or more limited if it would spill crosswise across the road. A house may be adjacent to the boundary at another point, and the parameters may dictate limiting light reaching the house, spilling across the boundary, at least at certain times of night. Comparable control parameters may be set based on an advanced process that is aware of adjacent features—for example, there may generally be no issue with light spilling into an adjacent forest, even if travel there is prohibited, and so the light in that direction may not need to be controlled against overspill of glaring light. The cloud can return designations of areas and logic rules for controlling feature usage under certain circumstances, tailored to the vehicle 100, its capabilities, and travel on that specific piece of land. Since light may generally travel a fixed distance at fixed levels, it can be reasonably possible to know where light will spill over and at what levels. Weather patterns, dust and other factors may effect the light to some extent, but control can still be imposed.

FIG. 2 shows an illustrative feature enablement process. When the vehicle 100 is within a fence where limited-use feature usage is permitted at 201, the process can determine if the feature can be enabled at 203. That is, some features, such as a loud sound system, may project in 360 degrees and thus may need to be limited until the vehicle is further within the land, where sound will diminish across the borders of the property. Lighting tends to be directional, so in this instance, the process determines if a vehicle heading is correct at 203, wherein a correct heading corresponds to directionality of light that will be above regular usage when outside of the property, and may constitute glaring light, among other things. If the heading is incorrect for any lighting systems at 203, the process may inform the driver at 205 so that the driver can adjust a vehicle 100 heading.

If the heading is correct for some or all lighting at 203, that lighting may be engaged (when requested) at 207 at levels of driver preference, including levels the driver may not be able to use elsewhere.

Vehicle sensors, such as cameras, LIDAR, RADAR, etc. may be able to sense objects within a field of view including at least within the lighting field at 209. This can include detection of other vehicles, persons, dwellings, animals, etc. The sensors may also be able to determine illumination reaching those objects and whether the illumination is or is likely to be glaring. If the sensed object is out-of-bounds (beyond a geofence, for example) or represents an object for which glare reduction may be preferable at 211, the process may dim the lighting at 213.

Sensors may not be able to measure light at a distance, since that determination is often done at the location of the illumination, and not from a source, but other methods to attempt to accommodate this factor are discussed herein. Lighting can be dimmed at 213 when deemed appropriate in order to mitigate any effect the lighting may have on areas outside the geofenced area, which can include limiting lighting to more conventional lighting under certain headings proximate to geofenced boundaries regardless of a prediction that nothing in particular is being problematically glared. The process may also inform the driver of the limiting and the reasons for limiting, and the driver can course correct and/or an alternative heading may be recommended as part of the information.

If and when the vehicle 100 travels outside the geofence at 215, the process can terminate all temporarily enabled systems at 217 (lighting in this example) to allow the driver to continue driving without having to stop and make special accommodation to ensure that all temporary systems are disabled.

FIG. 3A shows an illustrative feature control process. This is one example of how vehicles can monitor any limited-use feature usage in a manner that accommodates aspects of the feature that may extend beyond the immediate vehicle. Lighting is an example of this, since light travels away from the vehicle by design and may thus extend past the boundaries of a geofenced area even when the vehicle does not travel past those boundaries. FIG. 3B shows an illustrative geofence around a vehicle. The two figures will be described in conjunction.

At 301, the process draws a fence around the vehicle 100 based on present lighting parameters. That is, the process attempts to determine where light from vehicle lighting systems, including light that would be deemed excessively glaring, if not used on private land, falls in relation to a vehicle. For example, it may be predictable that a given headlight operated at a given power produces a certain amount of light at a certain distance. This may vary with weather, dust, etc., but the prediction can be made under clear conditions with maximum range, or whatever condition maximizes the range of glaring light.

For each light, the output at a certain distance is predicted based on prior observations for such a light made under controlled conditions, for example. A geofence is drawn around a boundary based on the heading of and power supplied to each headlight, at or past a range where the light is likely to constitute light defined as glaring light.

In FIG. 3B, vehicle 100 has enhanced forward facing headlights 118, and steerable upper lights 116. The upper lights are automatically steerable in this example, or at least the vehicle is capable of knowing the orientation of such lights. The vehicle also has enhanced rear lighting 321, which may be operated on demand or when a vehicle is in reverse.

Each light 116, 118, 321 has an output pattern 322. The output pattern 322 may be a controllable pattern, such as with LED lighting, or a fixed pattern from a single source. In either event, it may be possible to know the current output power and pattern, since an onboard controller may be controlling the power and pattern to each light. Or, when a person manually dictates a pattern or aiming, it may be possible to know the dictated power or aiming.

Based on where light is predicted to drop from glaring to non-glaring illumination, a geofence 325 may be drawn that moves with the vehicle 100. This fence can track the outer perimeter of glaring light, and can adapt to changes in patterns, power, and aimings of light sources. If, for example, source 116 were aimed in a new direction, the fence could shift to accommodate the new aiming. Similarly, if power were reduced to the lighting, or if a beam spread were to be widened or tightened, the fence 325 could change to accommodate. This allows for an adaptive lighting perimeter that can react when glaring light spills across a bounded perimeter of an area.

Similar concepts can be used to track other features extending beyond an immediate area of a vehicle. Sound may travel less regularly than light, and may be more difficult to track in this regard. With light, which tends to have at least a general directionality, the fence can be very close to the vehicle where there is limited or no lighting, and can extend hundreds of feet or more in front of the vehicle when very powerful lights are engaged. Even in routine travel, vehicles may be allowed to produce certain levels of light at certain distances, for the sake of a driver, and so the fence can have a minimum interior boundary that reflects the permissible usage of light under normal circumstances. This prevents the light from being fully diminished as a driver comes very close to a bounded perimeter of land—the vehicle can still output light considered permissible for public travel.

When the fence reaches a boundary at 303, which may be an indication that light above a permissible level will soon breach the boundary, the process can diminish the light sources that will breach the boundary. This can include limited reductions in light, and may generally be targeted specifically at the areas where the fence will breach the boundary, so that other lighting may remain unaltered, unless a driver wants other lighting lowered in concert. Since changes in light are near instantaneous, the vehicle 100 can react quickly and accurately to such conditions and can vary the light in accordance with perimeter proximity. A new range of glaring light can be calculated at 307, and the vehicle can refence the altered light field at 301.

Figure 4:
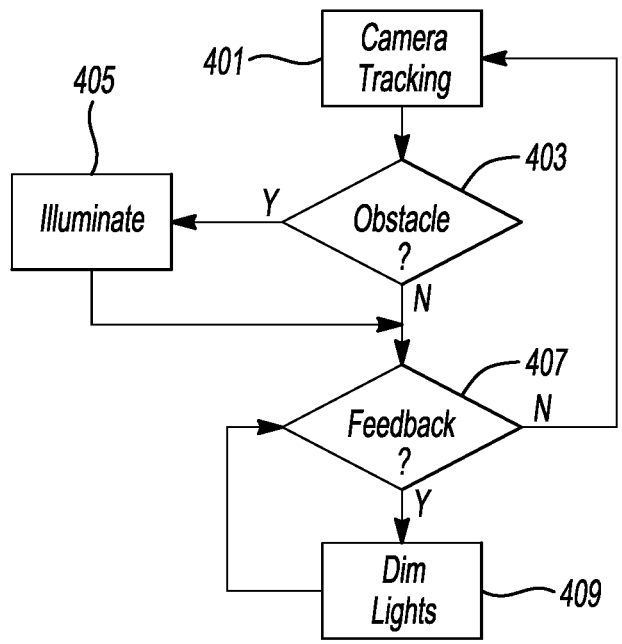
FIG. 4 shows an illustrative active feature adaption process.

FIG. 4 shows an illustrative active feature adaption process. In this example, the process can use advanced vehicle sensors to locate objects and obstacles and use vehicle lighting to highlight those obstacles. Since the lighting use has fewer constraints than under conventional circumstances, aimable lighting can be used to highlight obstacles in a way that may be more difficult when attempting to meet any necessary requirements for lighting on public roads.

Here, the camera or other sensors searches a field of view and/or path of travel for obstacles at 401, such as boulders, valleys, holes, bushes, stumps, etc. Cameras and other sensors can be used independently and/or in conjunction with each other using sensor fusion. Since the driver is presumably driving at night when using the advanced lighting, it may be difficult to discern such features from surrounding areas, especially when in brush or high grass. LIDAR and RADAR can be used to identify solid objects hidden from view as well, and IR sensing may be able to detect water or holes having different heat profiles, as well as animals laying within the grass.

If an object is detected at 403, the process may illuminate the object at 405, by focusing intense light at the object or otherwise lighting up a field of view in a manner that highlights the object, which could further include dimming light not illuminating the object to increase the relative difference of light on the object. The latter may be useful if lights are already operated at full power and increasing illumination within the field may not be effect or as effective as dimming surrounding illumination.

In a similar manner, cameras and other sensors can detect light feedback at 407. Dust, snow, heavy rain, etc., may cause light to reflect back towards a vehicle and lower powered light or use of a specific light set may provide further ranged vision under such circumstances, or at least light aimed lower so the reflected light does not return to the driver's eyes. When light feedback is detected at 407 that may be affecting how far a driver can see ahead, the process can dim or re-aim the lighting at 409 until the feedback diminishes. This allows for full usage of the powerful lights while reacting to changing circumstances to help preserve visibility ahead.

Figure 5:
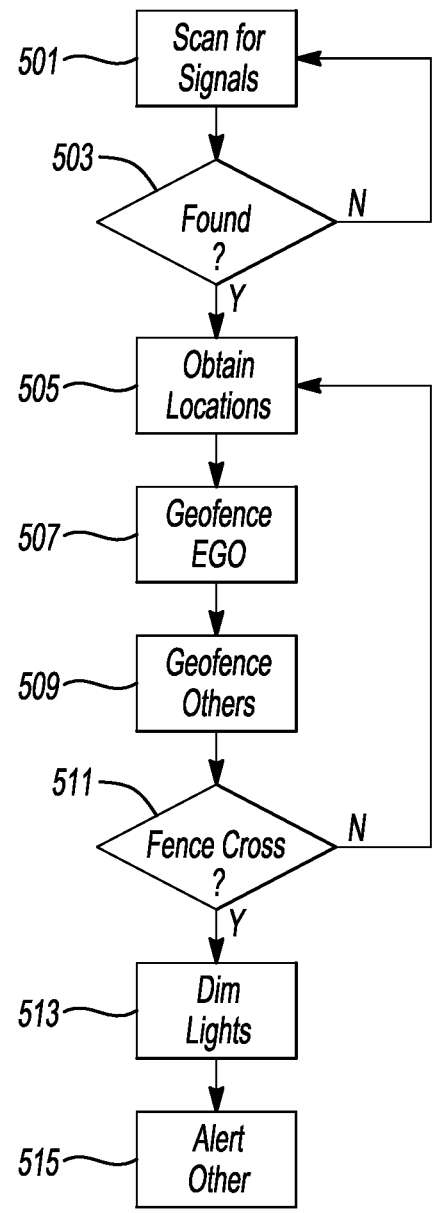
FIG. 5 shows an illustrative feature management process.

FIG. 5 shows an illustrative feature management process. Since travel on unmarked roads and across fields, especially at night, may make it difficult to track other drivers, vehicles 100 may communicate in order to provide better tracking of each other. This example uses a fencing technique similar to that of FIG. 3A, wherein the light fields can react to the presence of other drivers. Each vehicle could, for example, be fenced with two geofences—a first fence that bounds glaring light, and a second fence across which glaring light will preferably not cross.

The second fence may surround the cabin and be at some distance out from the cabin. Glaring a side of a vehicle is less of an issue, but the fence surrounding any areas including passengers, especially drivers, can help other vehicles dim the lighting appropriately. When vehicles are traveling in the same direction, or directly opposite each other, it may be easier to automatically control light output, but in circumstances where vehicles can travel in virtually any direction, alternative methodologies may be more useful than conventional adaptive headlight algorithms, which often react to the presence of conventional vehicle lights when viewed from behind or ahead.

This process scans for wireless signals from other vehicles at 501. It may be possible to have all vehicles traveling off road to broadcast an identity signal with some basic vehicle information, to aid in vehicle to vehicle (V2V) communication for circumstances where multiple drivers are not traveling on conventional roads. In addition to helping with adaptive vehicle control systems not encounter other vehicles, such information can assist with processes such as that in FIG. 5, where vehicles can control systems whose effects extend beyond the footprint of the vehicle.

If a signal from another vehicle is found at 503, the process can communicate with the vehicle and obtain a location of the vehicle at 505. This information may be included in the broadcast signal, and once vehicles communicate, they may preserve communication when possible to help each vehicle track the other(s).

The process may also create a geofence around itself (e.g., around emitted light and/or the cabin) at 507 as well as around the locations of any known vehicles at 509. Vehicles may also communicate any detection of light if desired—e.g., a vehicle may have one or more sensors capable of detecting light and reporting the amounts of detected light to other known vehicles emitting the detected light. Since the process may not know the exact positions of passengers in the other vehicles, the process may bound other vehicles with fences beyond a full perimeter of the other vehicles. These secondary fences are fences to which the process can react by changing lighting—such as the vehicle may react to a boundary around the land itself. While the other vehicle could report back with a more accurate bounded fence, in this example the ego vehicle creates the fence based on coordinates of the other vehicle and vehicle dimensions, which may be included in the broadcast (or derived from other vehicle information included in the broadcast).

If the light-bounding fence of the ego vehicle crosses the boundary drawn around the other vehicle at 511, the process can re-aim or dim any lighting that may affect the other vehicle at 513. The process may also alert the other vehicle of the change and proximity at 515, so the other vehicle can be aware of the proximity and react accordingly. This can be useful, for example, if one vehicle is traveling through the woods and another through an adjacent field, and the drivers may not fully appreciate the respective locations. If the wood-traveling vehicle turned towards the field, the light could illuminate the cabin of the other vehicle with glaring light, but when the turning vehicle can react to such light crossing the geofence around the other vehicle, the lighting can be dimmed and the vehicle making the turn can also inform the driver about the fact that light fields may cross and the driver may be turning towards a vehicle running parallel in the field.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a lighting system predesignated as limited-use; and
one or more processors configured to:
determine that an aiming of the lighting system is directed towards an interior of a bounded area predefined as suitable for use of the lighting system;
engage the lighting system responsive to the determination that the aiming is directed towards the interior of the bounded area;
monitor changes to the aiming of the lighting system; and
automatically control the lighting system relative to changes in the aiming of the lighting system indicating whether the lighting system is directed towards the interior of the bounded area or towards an exterior region outside the bounded area.

2. The vehicle of claim 1, wherein the automatic control of the lighting system includes terminating usage of the lighting system when the monitored change to the aiming of the lighting system indicates that the lighting system is directed towards the exterior region outside the bounded area.

3. The vehicle of claim 1, wherein the determination that the aiming of the lighting system is directed towards the interior of the bounded area includes consideration of projected distances of light resulting from engagement of the lighting system, exiting the vehicle lighting system and in a direction of the aiming.

4. A method comprising:
determining that a vehicle location is within a virtual boundary defining an area where a use-limited advanced vehicle lighting system is permitted for use, based on information associated with the area;
enabling usage of the vehicle lighting system responsive to determining that the location is within the virtual boundary;
tracking the vehicle location while a vehicle travels within the area; and
responsive to the vehicle location changing to outside the virtual boundary, disabling the vehicle lighting system;
monitoring an aiming of the vehicle lighting system while the vehicle travels within the area; and
automatically changing at least one of light output, aiming or a light pattern associated with the vehicle lighting system, to diminish illumination outside of the area, responsive to the monitored aiming of the vehicle lighting system indicating that light from the vehicle lighting system is aimed outside of the area.

5. The method of claim 4, wherein the automatic change is further responsive to a determination that the light from the vehicle lighting system that is aimed outside of the area will also produce illumination above a predefined threshold outside of the area.

6. A vehicle comprising:
a lighting system predesignated as limited-use; and
one or more processors configured to:
determine that a vehicle location is within a virtual boundary defining an area where a use-limited advanced vehicle lighting system is permitted for use, based on information associated with the area;
enable usage of the vehicle lighting system responsive to determining that the location is within the virtual boundary;
track the vehicle location while a vehicle travels within the area;
responsive to the vehicle location changing to outside the virtual boundary, disable the vehicle lighting system;
monitor an aiming of the vehicle lighting system while the vehicle travels within the area; and
automatically change at least one of light output, aiming or a light pattern associated with the vehicle lighting system, to diminish illumination outside of the area, responsive to the monitored aiming of the vehicle lighting system indicating that light from the vehicle lighting system is aimed outside of the area.

7. The vehicle of claim 6, wherein the automatic change is further responsive to a determination that the light from the vehicle lighting system that is aimed outside of the area will also produce illumination above a predefined threshold outside of the area.

* * * * *